(12) United States Patent
Witt et al.

(10) Patent No.: US 8,075,434 B2
(45) Date of Patent: Dec. 13, 2011

(54) PROFILED TIP POWER TRANSMISSION BELT

(75) Inventors: Richard J. Witt, Lawrence County, MO (US); Darrell Klein, Springfield, MO (US)

(73) Assignee: Dayco Products, LLC, Tulsa, OK (US)

( * ) Notice: Subject to any disclaimer, the term of this patent is extended or adjusted under 35 U.S.C. 154(b) by 0 days.

(21) Appl. No.: 10/636,788

(22) Filed: Aug. 6, 2003

(65) Prior Publication Data

US 2005/0032597 A1 Feb. 10, 2005

(51) Int. Cl.
*F16G 1/08* (2006.01)
*F16G 5/08* (2006.01)

(52) U.S. Cl. .................... 474/237; 474/238; 474/252

(58) Field of Classification Search .......... 474/152–156, 474/167, 203, 205, 252, 237–238; 156/137–138, 156/245

See application file for complete search history.

(56) References Cited

U.S. PATENT DOCUMENTS

| | | | |
|---|---|---|---|
| 288,479 A | 11/1883 | Otto | |
| 2,023,421 A * | 12/1935 | Heyer | 474/252 |
| 2,214,098 A | 9/1940 | Carlson | |
| 2,294,821 A * | 9/1942 | Yelm | 474/252 |
| 2,884,797 A * | 5/1959 | Murray | 474/167 |
| 2,988,925 A * | 6/1961 | Sauer | 474/205 |
| 3,098,778 A * | 7/1963 | Garner | 474/252 |
| 4,002,082 A | 1/1977 | Waugh | |
| 4,019,399 A | 4/1977 | Waugh | |
| 4,139,406 A | 2/1979 | Richmond et al. | |
| 4,177,686 A | 12/1979 | Jacob | |
| 4,216,679 A | 8/1980 | Howerton et al. | |
| 4,239,566 A * | 12/1980 | Howerton | 156/137 |
| 4,283,184 A * | 8/1981 | Berg | 474/203 |
| 4,512,834 A | 4/1985 | Kohrn | |
| 4,559,029 A | 12/1985 | Miranti, Jr. et al. | |
| 4,580,943 A | 4/1986 | Scully | |
| 4,614,509 A * | 9/1986 | Tangorra et al. | 474/153 |
| 4,614,510 A * | 9/1986 | Nishikori | 474/205 |
| 4,734,086 A | 3/1988 | Fisher et al. | |
| 4,850,943 A | 7/1989 | DiGiacomo et al. | |
| 4,895,555 A | 1/1990 | Watanabe et al. | |
| 4,904,232 A | 2/1990 | Kitahama et al. | |
| 4,938,736 A | 7/1990 | Miranti, Jr. | |
| 4,944,717 A * | 7/1990 | Georget | 474/238 |
| 4,960,476 A | 10/1990 | White, Jr. et al. | |
| 5,127,886 A | 7/1992 | Fujiwara et al. | |

(Continued)

FOREIGN PATENT DOCUMENTS

FR 994971 11/1951

(Continued)

OTHER PUBLICATIONS

AU, Examiners First Report, Australian Application No. 2004265646, 3 pages (Aug. 25, 2009).

(Continued)

*Primary Examiner* — Marcus Charles
(74) *Attorney, Agent, or Firm* — Thompson Hine LLP

(57) ABSTRACT

A power transmission belt comprising a belt body having a length and defining at least one elongate rib, the rib having an exposed surface that engages a cooperating pulley, the exposed rib surface having at least one longitudinal groove formed therein which reduces transverse modulus of the surfaces engaging the cooperating pulley and thereby reduce noise accompanying running of the belt.

15 Claims, 4 Drawing Sheets

U.S. PATENT DOCUMENTS

| | | | |
|---|---|---|---|
| 5,405,299 A | | 4/1995 | Kubo et al. |
| 5,492,507 A | | 2/1996 | Kumazaki |
| 5,518,460 A | * | 5/1996 | White et al. .................. 474/238 |
| 2003/0017901 A1 | | 1/2003 | Wilson et al. |
| 2003/0134705 A1 | | 7/2003 | Cheng |

FOREIGN PATENT DOCUMENTS

| | | |
|---|---|---|
| JP | 2003-106378 | 4/2003 |

OTHER PUBLICATIONS

AU, Examiners Report No. 2, Australian Application No. 2004265646, 2 pages (Apr. 7, 2010).

CN, First Office Action, Chinese Application No. 200480022523.0, 6 pages (Sep. 21, 2007).

CN, Second Office Action, Chinese Application No. 200480022523.0, 6 phages (Apr. 18, 2008).

CN, Third Office Action, Chinese Application No. 200480022523.0, 6 pages (Mar. 13, 2009).

CN, Rejection Decision, Chinese Application No. 200480022523.0, 9 pages (Sep. 18, 2009).

EP, Supplementary European Search Report, European Application No. 04779524.8, 3 pages (Sep. 6, 2006).

EP, Examination Report, European Application No. 04779524.8, 4 pages (Nov. 9, 2007).

IN, Examination Report, Indian Application No. 448/CHENP/2006, 3 pages (Dec. 7, 2007).

PCT, International Search Report, PCT/US04/24621, 3 pages (mailed Jun. 8, 2005; published Jul. 14, 2005).

PCT, Written Opinion, PCT/US04/24621, 4 pages (Jun. 8, 2005).

PCT, International Preliminary Report on Patentability, PCT/US04/24621, 4 pages (Nov. 14, 2005).

JP, Office Action, Japanese Application No. 2006-522629; 2 pages (Jul. 20, 2010).

Satoshi and Makoto, Published abstract and English machine translation of JP 2003-106378 (reference dated Apr. 9, 2003), obtained Aug. 25, 2010, Japan Patent Office, Japan, pp. 1-10.

CA, Office Action, Canadian Application No. 2,533,366 (Jan. 5, 2011).

Shimoo and Sakashita, "V-Ribbed Belt," JP 2003-016378A, first published Apr. 9, 2003; machine translation from Japan Patent Office Intellectual Property Digital Library.

KR, Notice of Preliminary Rejection, Korean Application No. 7002348/2006 (May 2, 2011).

* cited by examiner

PROFILED TIP POWER TRANSMISSION BELT

BACKGROUND

1. Field of the Invention

This invention relates to power transmission belts and, more particularly, to a power transmission belt having at least one rib with a longitudinal groove formed therein that reduces noise accompanying the running of the belt.

2. Background Art

V-belts and V-ribbed belts are used in a wide range of environments. V-ribbed belts are preferred for their high power transmission capability, which is attributable to the large in contact area between the ribs on the belt and the flank on the cooperating pulleys.

In operation, there is a tendency for V-belts and V-ribbed belts to emit noise; a common complaint, especially on automotive drives. Belt noise is predominately the result of pulley engagement and disengagement noise arising as the ribs on the belt enter into and exit from the pulley grooves or arising from excessive rotational slip of the pulley relative to the belt. Rotational slip occurs during rapid acceleration or deceleration of the drive such as is encountered during shifting, engine startup or engine shutdown or due to excessive loading or insufficient wrapping around the pulleys.

Previous attempts to reduce belt noise have utilized materials substitutions and have focused on interfacial characteristics between the pulley and the belt flanks without affecting the forces normal to the belt flanks.

SUMMARY OF THE INVENTION

An object of the present invention is to reduce the noise which accompanies the use of V-ribbed belts and V-belts.

According to the present invention, a power transmission belt is provided comprising an endless belt body having a length, a tension section, a load-carrying section, and a compression section and defining at least one elongate rib, the rib having an exposed surface that engages a cooperating pulley, the exposed rib surface having at least one longitudinal groove formed therein.

More particularly, the invention provides a multiribbed power transmission belt comprising an outer portion or tension section, a load-carrying section having a plurality of transversely spaced, longitudinally extending tensile cords embedded therein, a fabric cover on the outer surface of the outer portion of the belt, and a compression section extending inwardly from said outer portion and defining a plurality of laterally spaced, longitudinally extending ribs, each rib having an inner portion formed of a rubber material, inwardly converging planar opposite side surfaces for engaging complementary pulley groove side surfaces, and having an exposed rib surface having at least one longitudinal groove therein.

The longitudinal groove formed in the external rib surface(s) is believed to reduce noise by reducing the transverse compression modulus of the belt flanks. This reduces the tendency for noise by facilitating lateral deflection of the rib flanks near the rib tips during engagement with the pulley flanks such that the normal force to the rib flanks progressively increases along the height of the rib flank from the tip to the base of the rib, reducing the normal force at the tip during engagement where relative motion with the pulley flank is the greatest.

DESCRIPTION OF THE PREFERRED EMBODIMENTS

The preferred embodiment is described below with reference to the accompanying drawings. While the various features of this invention are hereinafter illustrated and described as being particularly adapted to provide an endless power transmission V-ribbed belt construction, it is to be understood that the various features of this invention can be utilized singularly or in various combinations thereof to provide other belt constructions such as round or V-belt constructions useful in automotive and/or industrial applications.

Figure 1:
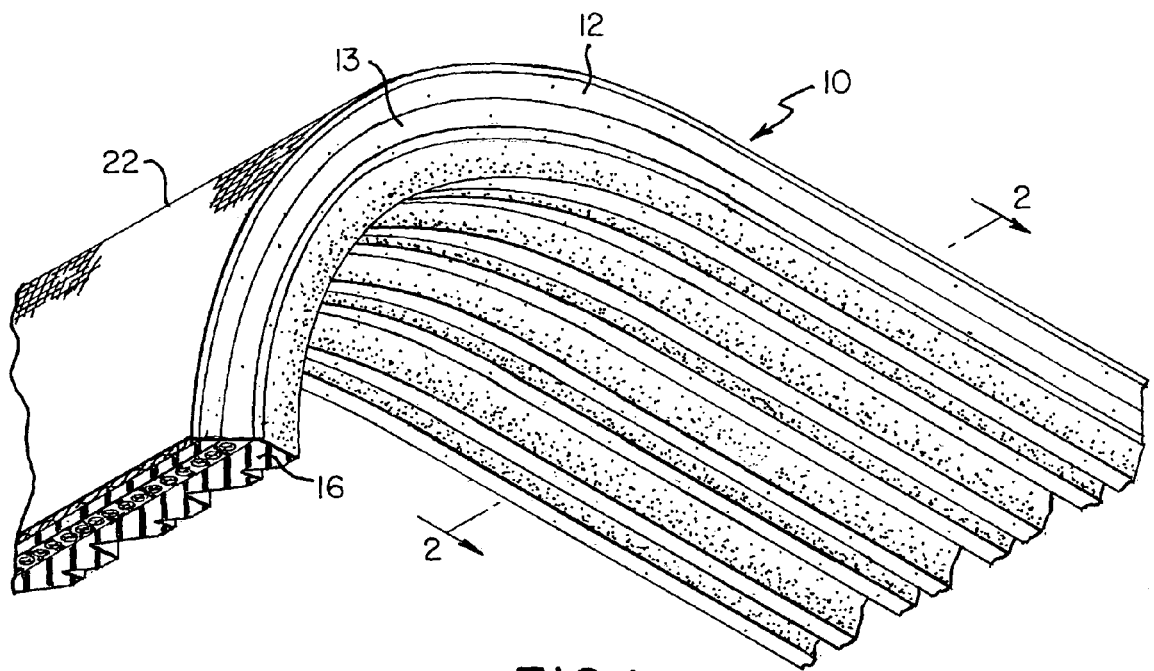
FIG. 1 is a perspective view illustrating one exemplary embodiment of a V-ribbed belt in accordance with the present invention.
Figure 2:
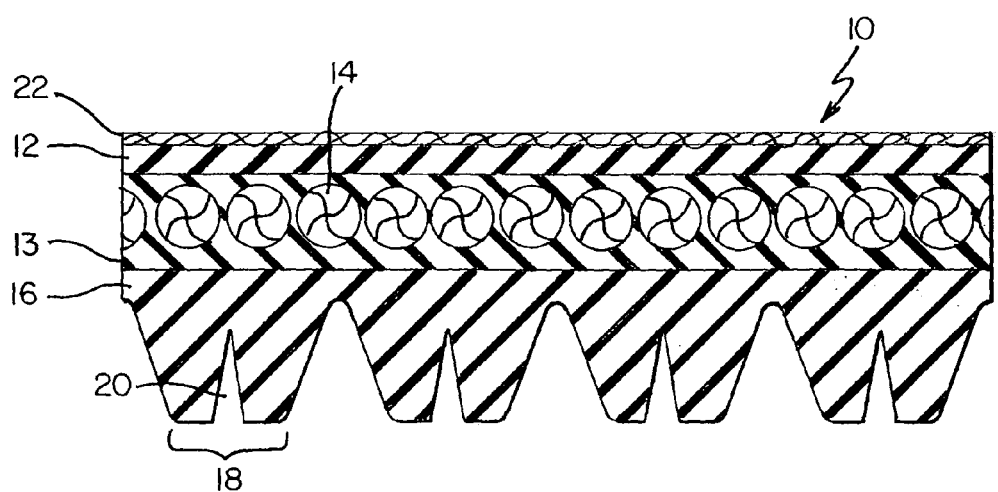
FIG. 2 is a sectional view along the line 2-2 of FIG. 1.
Figure 2A:
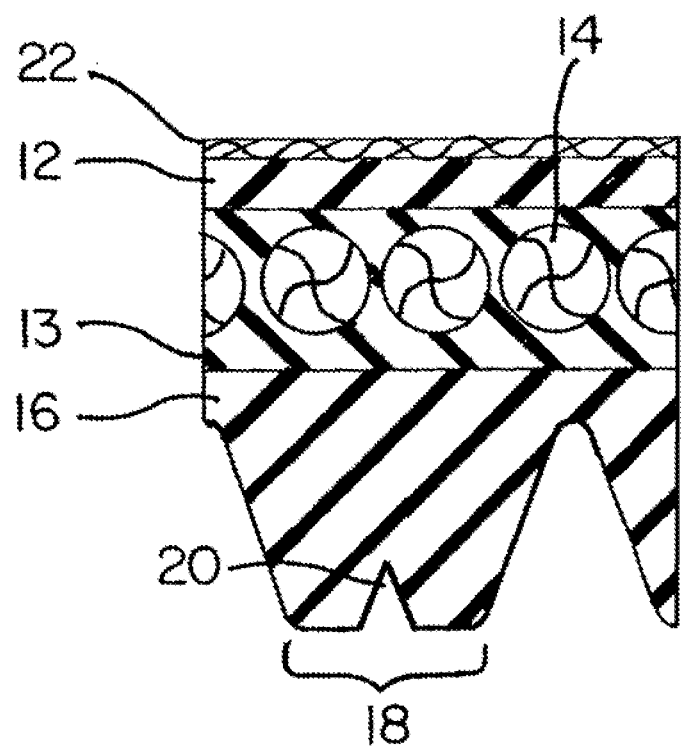
FIG. 2A is a fragmentary sectional view along the line 2-2 for an exemplary embodiment having a lesser groove depth.
Figure 2B:
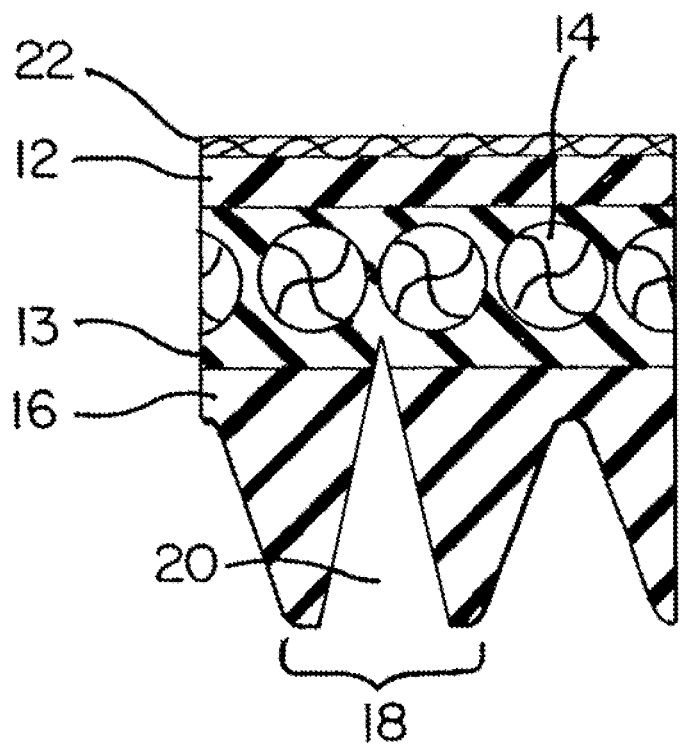
FIG. 2B is a fragmentary sectional view along the line 2-2 for an exemplary embodiment having a greater groove depth and a greater groove width.

As shown in FIGS. 1 and 2, a V-ribbed belt 10 comprises a tension layer 12, a load-carrying section 13 having cords 14 and a compression section 16, which in this example includes four ribs 18 formed therein extending in parallel along the longitudinal axis of the belt under the load carrying section 13. In each rib 18 is at least one groove 20. A cover fabric 22 may be provided above the tension layer 12. The number of ribs in the belt will vary with the application. In automotive applications, the number of ribs will typically be about 3 to 10. However, for other applications belts having 20 or more ribs are known. When the belt includes more than one rib, i.e., in multiribbed belts, grooves may be provided in all or fewer than all the ribs. In one embodiment, groove(s) may be provided in the outside rib surfaces but not in the inner rib surfaces. Alternatively, grooves may be provided in the inner rib surfaces but not in the outside rib surfaces.

This is only one example of a belt construction in accordance with one embodiment of the invention. Those skilled in the art will recognize that the present invention can be used in conjunction with substantially any ribbed belt or V-belt. V-ribbed belts in accordance with certain embodiments of the invention may come in any of several cross-sectional sizes, referred to as (US) PVH, PVJ, PVK, PVL, and PVM, (ISO) PH, PJ, PK, PL, and PM, in ascending order of pitch between the ribs.

The grooves 20 are shown as being V-shaped, however, a person skilled in the art will recognize that other groove shapes can be used including U-shaped or a square groove. Parabolic and curvilinear variations are included. The groove 20 reduces noise by reducing the transverse force required to deflect the flanks of the belt and providing smooth engagement and minimization of interference upon engagement or disengagement with the pulley. In terms of the rib width, the grooves in each rib surface can be from about 3% to about 95%, more particularly from about 15% to about 70% of the width of the rib for a V-ribbed belt and from about 3% to about 100%, more particularly from about 15% to about 70%, of the width of the rib for a V-belt. The grooves can extend to a depth which is up to just less than the depth of the cords 14 in load carrying section 13. In terms of the rib height, as measured from the root of the groove between the belt ribs and the innermost surface of the belt rib, the grooves can range from about 10% to about 120%, more particularly from about 25% to about 100%, of the rib height for a V-ribbed belt and from about 10% to about 95%, more particularly from about 25% to about 75%, of the rib height for a V-belt.

Specific dimensions will vary with the belt cross-section. For example, in a PK section belt, the rib is about 2 mm deep and the groove in certain embodiments is from about 0.5 mm to 2.0 mm, more particularly about 1.0 mm, deep and from about 0.25 mm to about 0.75 mm, more particularly about 0.40 mm, wide. In the case of a PL section belt the rib is about 3.5 mm deep and the depth of the groove is about 1.75 mm.

More than one longitudinal groove may be provided in each rib if desired. As a general rule, however, space will limit the number of grooves to one or two. The grooves may be formed in the belt by grinding the groove into the rib surface or by molding the groove into the rib, by cutting with a sabre-type or rotating knife, by flycutting or other machining operation, or by any other means known in the art, as may be used for also cutting the ribs. The ribs may be formed, and the grooves may be formed by different means, as permitted or desired in the manufacturing process. For a discussion of forming the surface of ribs by grinding see U.S. Pat. No. 5,492,507.

The materials used to form the belt, for example, the rubber compounds, fabrics and cords, can be selected from among those materials that are known in the art as being useful for this purpose.

Figure 3:
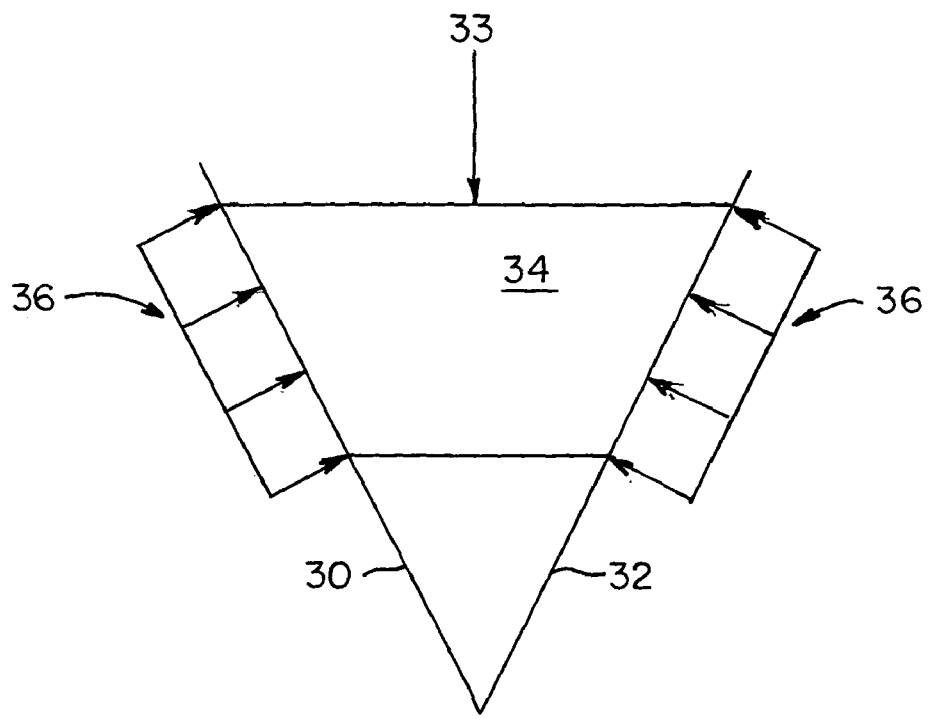
FIGS. 3 and 4 are schematic diagrams illustrating the flank force distribution for a conventional V-belt (FIG. 3) and a belt in accordance with one embodiment of the invention (FIG. 4).
Figure 4:
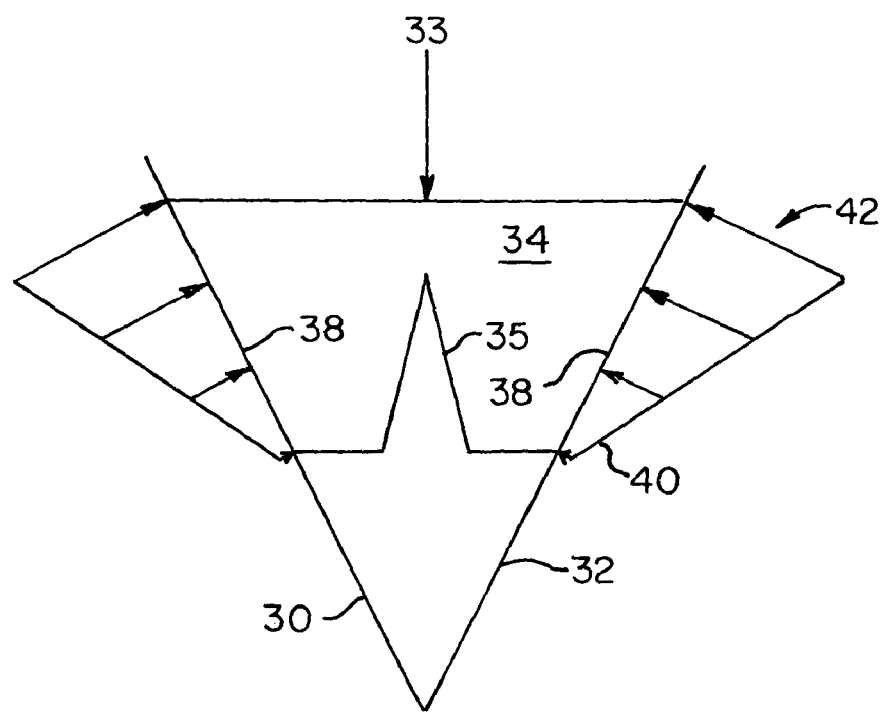

One theory for the noise reduction achieved in accordance with the present invention is illustrated in FIGS. 3-6. FIGS. 3 and 4 are schematic diagrams illustrating the flank force distribution for a conventional V-belt (FIG. 3) and a V-belt in accordance with one embodiment of the invention (FIG. 4). With reference to FIG. 3, the pulley flanks are schematically identified by lines 30 and 32 and the tensioning force is identified by arrow 33. The belt is defined by the trapezoidal area 34. As shown in FIG. 3, in a conventional belt, the flank force lines 36 are approximately equal along both flanks of the belt 34. With reference to FIG. 4, the V-belt 34 includes a groove 35. When the belt is seated in the pulley defined by flanks 30 and 32, the forces on the flanks 38 of the belt are distributed as shown in FIG. 4. Specifically, the groove 35 allows transverse deflection such that the force in area 40 at the tip of the rib is relatively low and the force gradually increases in the region of the upper flank surface 42.

Figure 5:
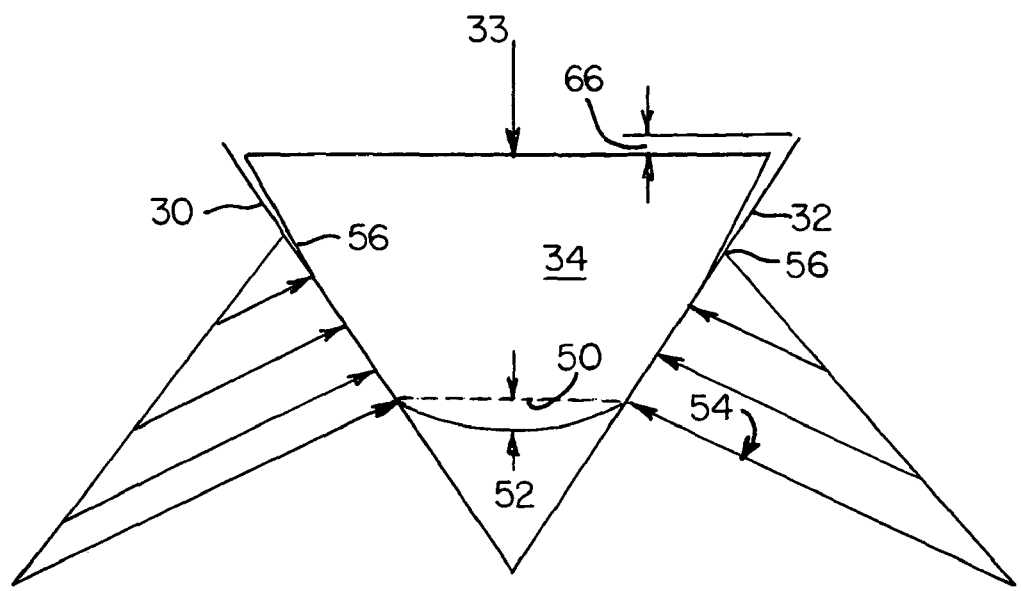
FIGS. 5 and 6 are schematic diagrams illustrating flank force distribution for a conventional belt and for a belt in accordance with one embodiment of the invention when there is an angle mismatch between the belt and the pulley
Figure 6:
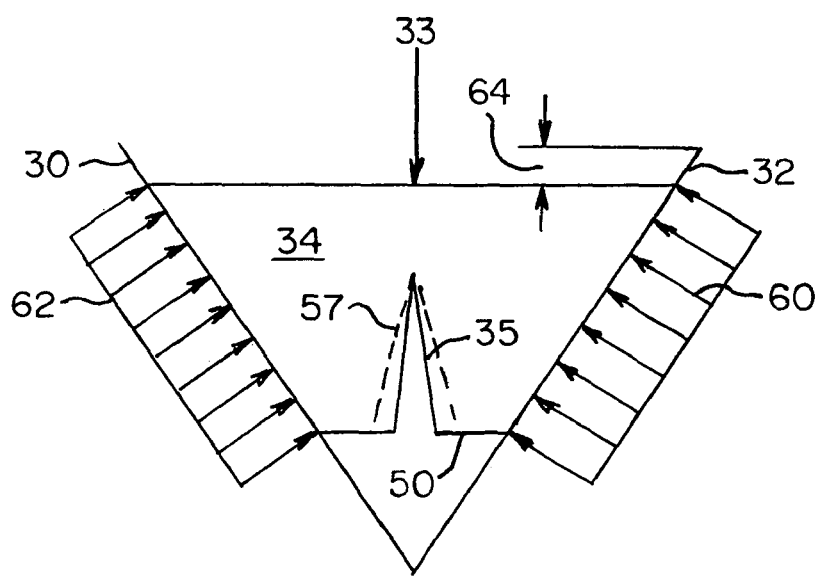

FIGS. 5 and 6 illustrate the flank force distribution when there is an angle mismatch between the V-belt and the pulley, which commonly occurs in practice due to deformation of the compression section of the belt when bending to small diameter pulleys. As shown in FIG. 5, the inner surface 50 (indicated at its original position by a dotted line) of a conventional V-belt deforms as shown by line 52 and the flank force is high in the region 54 adjacent the inner surface 50 and decreases from the inner surface 50 to the point 56 in which the V-belt is no longer in contact with the pulley surfaces 30 and 32.

By comparison, as shown in FIG. 6, when the V-belt 34 includes a groove 35 in accordance with the present invention, deformation that accompanies angle mismatch of the belt and pulley does not occur significantly at the outer surface 50 but rather occurs along the groove 35. The sides of the groove are designated by the dotted lines 57 prior to deformation and by solid lines 35 after deformation. Because deformation of the belt occurs principally in the groove 35, the V-belt 34 is able to seat evenly on the pulley flanks 30 and 32 and provide a fairly uniform flank force distribution as indicated by the force lines 60 and 62.

Another advantage associated with the present invention is that the presence of the groove 35 and the ability of the groove to deform when there is an angle mismatch with the pulley promote complete seating of the V-belt 34 on the pulley flanks as indicated by the distance 64. By contrast, as shown in FIG. 5, the conventional V-belt fails to completely seat when there is an angle mismatch with the pulley as indicated by distance 66.

By comparison, as shown in FIG. 6, when the V-belt 34 includes a groove 35 in accordance with the present invention, deformation that accompanies angle mismatch of the belt and pulley does not occur significantly at the inner surface 50 but rather occurs along the groove 35. The sides of the groove are designated by the dotted lines 57 prior to deformation and by solid lines 35 after deformation. Because deformation of the belt occurs principally in the groove 35, the V-belt 34 is able to seat evenly on the pulley flanks 30 and 32 and provide a fairly uniform flank force distribution as indicated by the force lines 60 and 62.

Having described the invention in detail and by reference to specific embodiments thereof, it will be apparent that numerous modifications and variations are possible without departing from the spirit of the invention as defined by the following claims.

What is claimed:

1. A power transmission belt comprising:
   a belt body having a length and defining a plurality of elongate ribs extending in parallel along the longitudinal axis of the belt, the ribs providing belt surfaces for engaging a cooperating pulley; and
   at least one rib having a tip, a base, and a longitudinal groove formed therein, the groove having a depth of at least 50 percent and less than 120 percent of a rib height of the at least one rib,
   wherein the groove is sized and shaped to reduce a transverse force required to deflect the pulley engaging belt surfaces of the at least one rib, and such that the required transverse forces progressively increase from the tip to the base of the at least one rib, and
   wherein the groove is sized and shaped such that opposing surfaces of the groove are normally spaced-apart during use with the at least one rib in engagement with the cooperating pulley.

2. The belt of claim 1 wherein the groove runs the longitudinal extent of the rib.

3. The belt of claim 2 wherein the belt includes at least three ribs.

4. The belt of claim 1 wherein the groove is substantially V-shaped.

5. The belt of claim 1 wherein the belt includes a load carrying section and the load carrying section includes a cord that is wrapped internally of the belt to form a cord line.

6. The belt of claim 5 wherein the groove has a depth which is less than the distance from the innermost exposed surface of the rib to the cord line.

7. The belt of claim 1 wherein the longitudinal groove at the tip of the at least one rib has an undeflected width that is between 15 percent to 70 percent of an undeflected width of the tip of the at least one rib.

8. The belt of claim 1 wherein the longitudinal groove in the at least one rib has a depth of 50 percent of the rib height of the at least one rib.

9. A multiribbed power transmission belt comprising:
an outer portion having a plurality of transversely spaced, longitudinally extending tensile cords embedded therein and a compression section extending inwardly from said outer portion and defining a plurality of laterally spaced, longitudinally extending ribs,
wherein each rib includes a base, an innermost rib surface, and inwardly converging planar opposite side surfaces extending therebetween for engaging complementary pulley groove side surfaces,
wherein at least one of said ribs includes an exposed innermost rib surface having at least one longitudinal groove therein, the groove having a depth of at least 50 percent and less than 120 percent of a rib height of the at least one rib,
wherein the groove is sized and shaped to reduce a transverse force required to deflect the side surfaces of the at least one rib, and such that the required transverse forces increase along the side surfaces from the innermost rib surface to the base of the at least one rib, and
wherein the groove is sized and shaped such that the opposing surfaces of the groove are normally spaced-apart during use with the at least one rib in engagement with the pulley groove side surfaces.

10. The belt of claim 9 wherein the groove runs the longitudinal extent of the rib.

11. The belt of claim 10 wherein the belt includes at least three ribs.

12. The belt of claim 11 wherein the groove has a depth which is less than the distance from the exposed surface of the rib to the tensile cords.

13. The belt of claim 9 wherein the groove is substantially V-shaped.

14. The belt of claim 9 wherein the longitudinal groove at the innermost rib surface of least one rib has an undeflected width that is between 15 percent to 70 percent of the undeflected width of the innermost rib surface of the at least one rib.

15. The belt of claim 9 wherein the longitudinal groove in the at least one rib has a depth of 50 percent of the rib height of the at least one rib.

* * * * *